US011206362B2

(12) United States Patent
Ahn

(10) Patent No.: US 11,206,362 B2
(45) Date of Patent: Dec. 21, 2021

(54) TERMINAL AND SERVER PROVIDING A VIDEO CALL SERVICE

(71) Applicant: HYPERCONNECT, INC., Seoul (KR)

(72) Inventor: Sangil Ahn, Cheongju-si (KR)

(73) Assignee: Hyperconnect, Inc., Seoul (KR)

( * ) Notice: Subject to any disclaimer, the term of this patent is extended or adjusted under 35 U.S.C. 154(b) by 46 days.

(21) Appl. No.: 16/730,067

(22) Filed: Dec. 30, 2019

(65) Prior Publication Data

US 2020/0213530 A1 Jul. 2, 2020

(30) Foreign Application Priority Data

Dec. 31, 2018 (KR) .......................... 10-2018-0174192

(51) Int. Cl.
| | |
|---|---|
| *H04N 7/14* | (2006.01) |
| *H04N 5/262* | (2006.01) |
| *G06T 5/00* | (2006.01) |
| *H04L 12/18* | (2006.01) |

(52) U.S. Cl.
CPC ........... *H04N 5/2621* (2013.01); *G06T 5/002* (2013.01); *H04L 12/1822* (2013.01); *H04L 12/1827* (2013.01); *H04N 7/147* (2013.01)

(58) Field of Classification Search
CPC ...... H04N 7/147; H04N 5/2621; H04N 7/152; G06T 5/002; H04L 51/10; H04L 12/1827; H04L 12/1822
USPC .................................. 348/239, 14.01–14.16
See application file for complete search history.

(56) References Cited

U.S. PATENT DOCUMENTS

| | | | |
|---|---|---|---|
| 6,590,601 B2 | 7/2003 | Sukeno et al. | |
| 9,591,261 B2* | 3/2017 | Suzuki | .................... H04N 7/147 |
| 2008/0259154 A1* | 10/2008 | Garrison | .................. H04N 7/14 |
| | | | 348/14.01 |
| 2012/0182379 A1* | 7/2012 | Ding | ...................... H04N 7/147 |
| | | | 348/14.02 |
| 2018/0260577 A1* | 9/2018 | Adams | .................. H04W 12/08 |
| 2018/0316892 A1* | 11/2018 | Jeong | ................. H04N 21/4223 |
| 2019/0199963 A1* | 6/2019 | Ahn, II | .................... H04N 7/147 |

FOREIGN PATENT DOCUMENTS

| | | |
|---|---|---|
| JP | 2001-309325 A | 11/2001 |
| JP | 2006-270380 A | 10/2006 |
| KR | 10-2011-0025720 A | 3/2011 |

OTHER PUBLICATIONS

Communication dated Nov. 25, 2019 by the Korean Patent Office in application No. 10-2018-0174192.

* cited by examiner

*Primary Examiner* — Melur Ramakrishnaiah
(74) *Attorney, Agent, or Firm* — KPPB LLP

(57) ABSTRACT

A method for providing a video call service of a terminal according to an embodiment includes establishing a video call session with a second terminal, transmitting a first video that is a photographed video of a first user, from the first terminal to the second terminal, modulating a second video that is a photographed video of a second user and that is received from the second terminal, to a first intensity, and displaying the modulated second video, detecting a predetermined event while the video call session is being maintained, and controlling an intensity of the modulation based on the predetermined event.

15 Claims, 13 Drawing Sheets

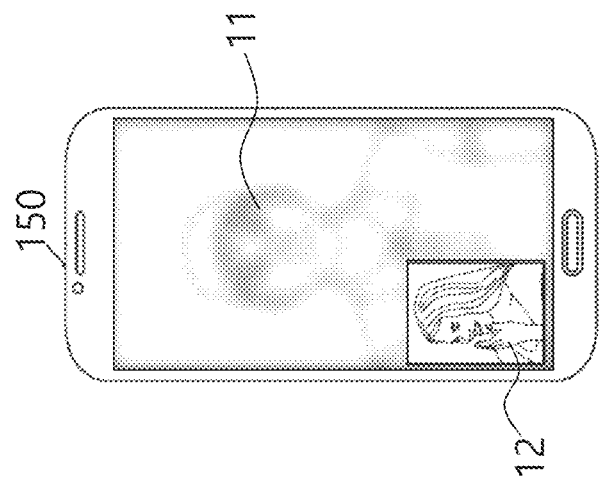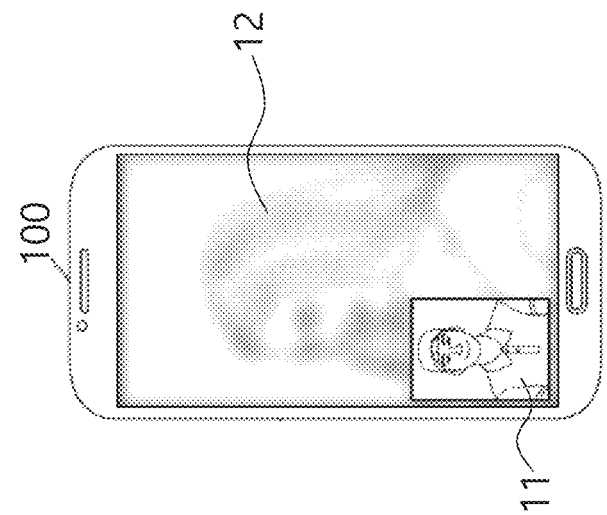
Fig. 3

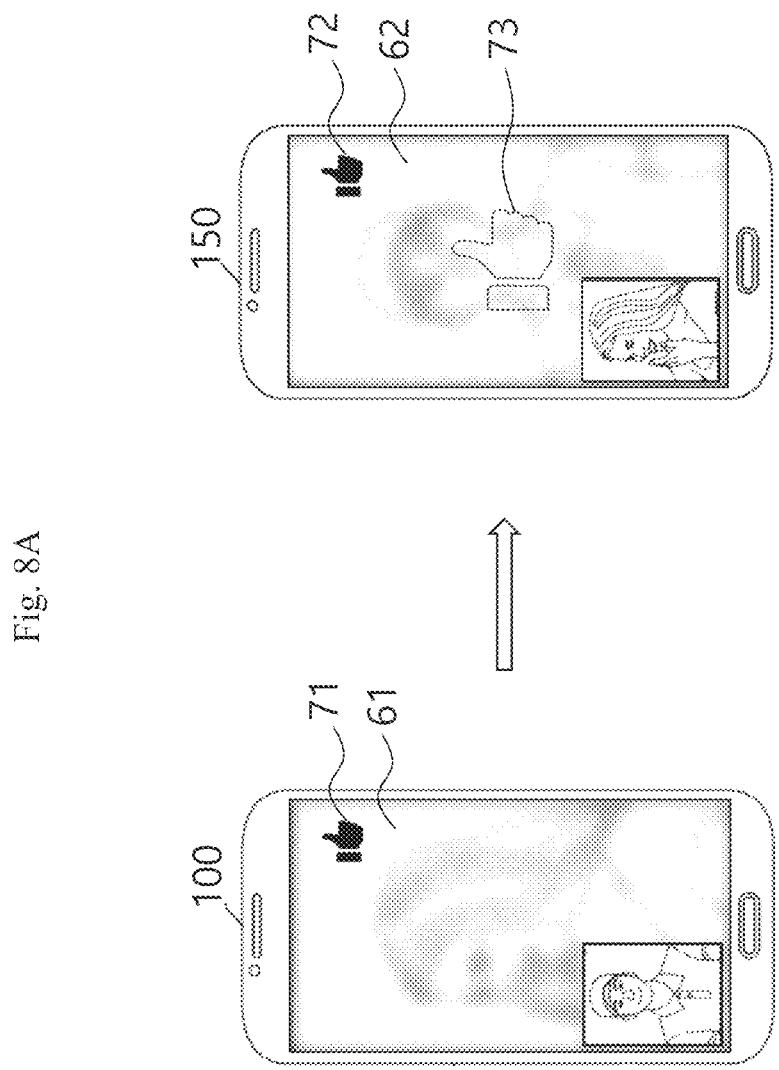

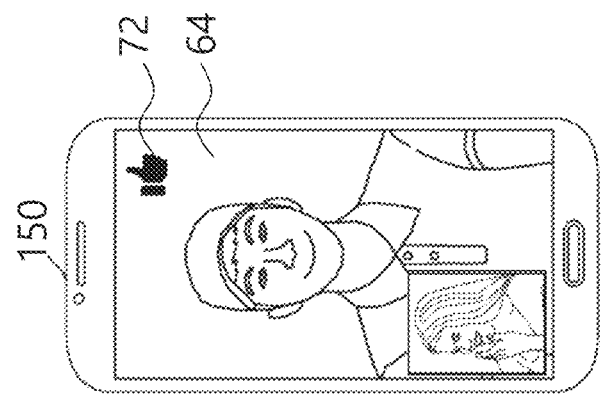
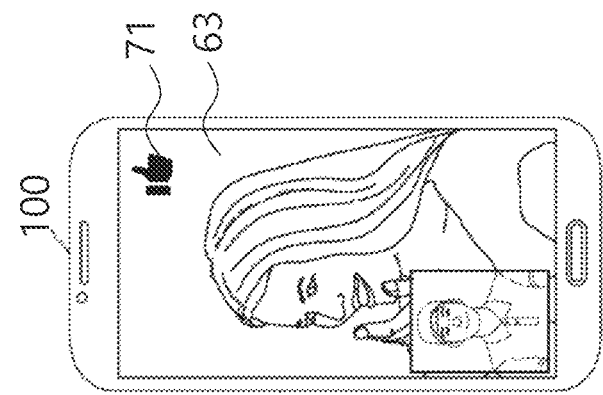
Fig. 8B

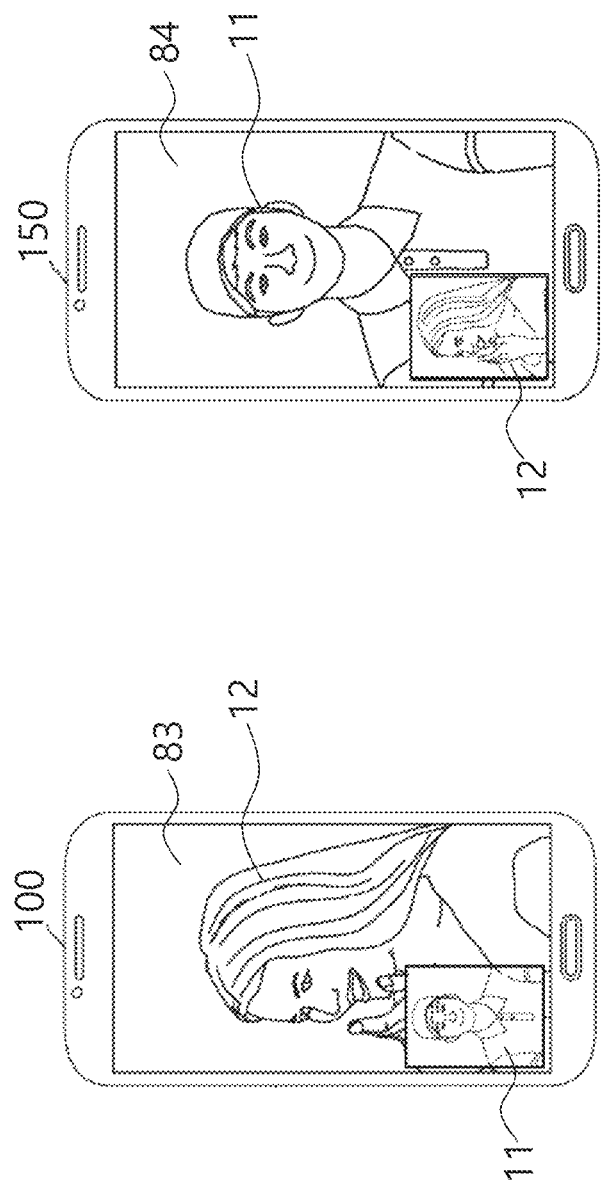

TERMINAL AND SERVER PROVIDING A VIDEO CALL SERVICE

CROSS-REFERENCE TO THE RELATED APPLICATION

This application claims priority to Korean Patent Application No. 10-2018-0174192 filed on Dec. 31, 2018 in the Korean Intellectual Property Office, the disclosure of which is incorporated herein in its entirety by reference.

BACKGROUND

1. Field

The present disclosure relates to a terminal and server providing a video call service capable of gradually increasing the resolution of a video of a counterpart.

2. Description of the Related Art

A video call service outputs the voice of a counterpart at the same time of displaying a video of the counterpart on a screen during a call, and thus the video call service has advantages to enable the users to see each other during the call, and to easily exchange the emotional state of each other compared to calls where the users could only hear each other's voices.

With the recent realization of high-speed information communication technologies, and the expanded supply of terminals equipped with video call functions, video call services are receiving attention, and the utilization rate of video calls continues to gradually increase by the day.

However, despite the convenience of a video call, there is a risk that its improved quality of images may directly expose the user and the surrounding environment to the counterpart involuntarily, thereby infringing upon the user's portrait rights and privacy.

According to the present disclosure, it is possible to provide a method, server and terminal providing a video call service capable of adjusting the intensity of the modulation of a user's video according to an event occurring during progression of the video call service.

SUMMARY

According to the present disclosure, an application stored in a computer readable recording medium is provided, wherein the application may include, in a first terminal: establishing a video call session with a second terminal, transmitting a first video that is a photographed video of a first user, from the first terminal to the second terminal, modulating a second video that is a photographed video of a second user and that is received from the second terminal, to a first intensity, and displaying the modulated second video, detecting a predetermined event while the video call session is being maintained, and controlling an intensity of the modulation based on the predetermined event.

According to the present disclosure, a server may include an interface for performing communication with at least one terminal, a processor, and a memory for storing commands executable by the processor, wherein the processor may establish a video call session between a first terminal and a second terminal of the at least one terminal, modulate a video of a first user received from the first terminal and emit the modulated video of the first user to the second terminal, modulate a video of a second user received from the second terminal and emit the modulated video of the second user to the first terminal, detect a predetermined event from at least one of the first terminal and the second terminal, and adjust an intensity of the modulation of the video of the first user and of the video of the second user based on the predetermined event.

According to the present disclosure, a non-transitory computer readable recording medium where commands executable by a processor are stored, is provided, wherein the recording medium may include commands for establishing a video call session between a first terminal and a second terminal, commands for modulating a video of a second user received from the second terminal and displaying the modulated video of the second user, commands for detecting a predetermined event while the video call session is being maintained, and commands for controlling an intensity of the modulation based on the predetermined event.

BRIEF DESCRIPTION OF THE DRAWINGS

FIG. 3 is a view illustrating a terminal where a modulated video is provided according to an embodiment of the present disclosure;

FIGS. 8A and 8B are views illustrating a method in which the intensity of the modulation of a video is controlled by interactions detected between terminals according to an embodiment of the present disclosure;

FIGS. 9A and 9B are views illustrating a method in which the intensity of the modulation of a video is controlled by interactions between terminals according to another embodiment of the present disclosure;

DETAILED DESCRIPTION

Hereinbelow, embodiments of the present disclosure will be explained in detail so as to be easily implemented by a person skilled in the art. However, the present disclosure may be embodied in various different forms, and therefore, the present disclosure is not limited to the embodiments that will be disclosed hereinafter. Further, for clarity in disclosing the present disclosure, illustrations about parts that are not related to the present disclosure have been omitted from the drawings, and identical or like references refer to identical or like configurative elements.

The purpose and effect of the present disclosure will be naturally understood by the explanation hereinbelow, and not limited by the explanation hereinbelow.

Hereinbelow, a desirable embodiment of the present disclosure will be explained in detail with reference to the drawings attached.

The video call service refers to a service that enables a plurality of users to transmit video of themselves to a counterpart using their respective terminals, thereby communicating with one another. The users who use the video call service may transceive video and voice between one another through their respective terminals, and transceive texts using the chatting function. The user who intends to use the video call service may do so by directly designating a counterpart or by designating a counterpart according to a randomized or predetermined method in a server that provides the video call service.

Figure 1:
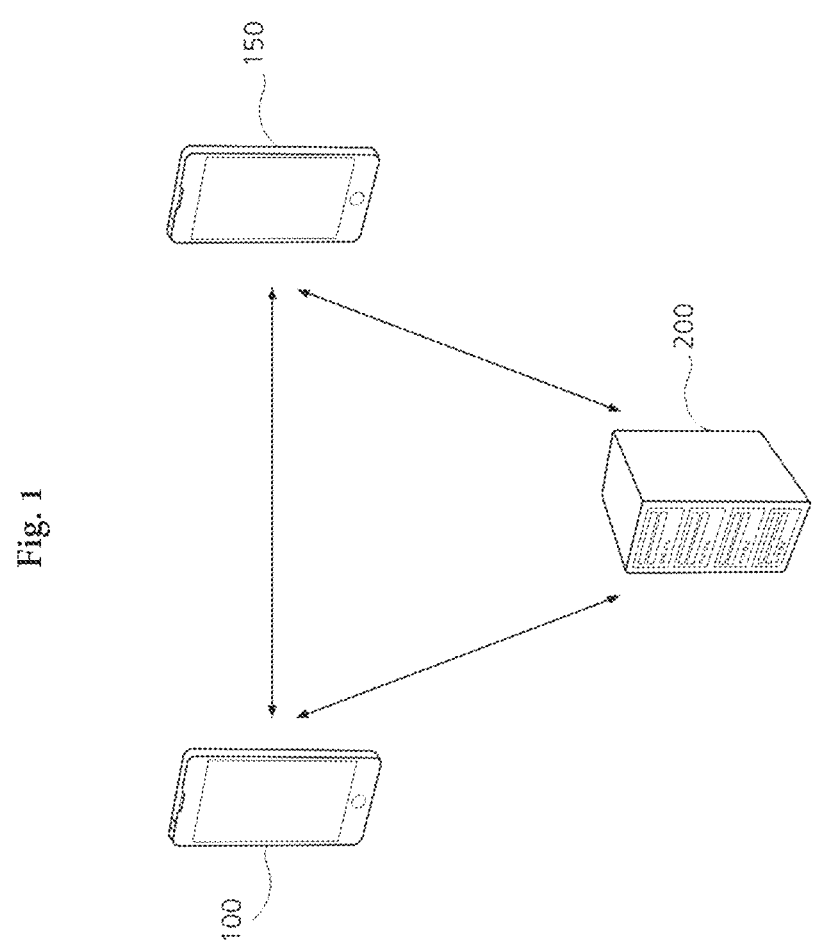
FIG. 1 is a view for explaining an environment where a video call service is provided.

FIG. 1 is a network configuration diagram illustrating an environment where an electronic device operates according to an embodiment of the present disclosure. Referring to FIG. 1, the environment where a plurality of electronic devices 100, 150 operate, may include a server 200 and the plurality of electronic devices 100, 150. For example, the environment where the plurality of electronic devices 100, 150 operate may not include the server 200.

The plurality of electronic devices 100, 150 may each be connected by medium of the server 200. For convenience of explanation of the present disclosure, two electronic devices are illustrated in FIG. 1. However, the number of the electronic devices is not limited to two. Each of the plurality of electronic devices 100, 150 may be embodied as any one of a desktop computer, laptop computer, smartphone, smart tablet PC, smart watch, mobile terminal, digital camera, wearable device, or portable electronic device. The plurality of electronic devices 100, 150 may execute a program or application. For example, at least two electronic devices of the plurality of electronic devices 100, 150 may be matched by the server 200. Further, the matched electronic devices may perform a video call with each other.

The plurality of electronic devices 100, 150 may each be connected to a communication network. The plurality of electronic devices 100, 150 may each be connected with another external device through the communication network. The plurality of electronic devices 100, 150 may each transmit or receive data to or from the other device connected therewith.

The communication network connected with each of the plurality of electronic devices 100, 150 may include a wired communication network, wireless communication network, or complex communication network. The communication network may include a mobile communication network such as 3G, LTE, or LTE-A, etc. The communication network may include a wired or wireless communication network such as Wi-Fi, UMTS/GPRS, or Ethernet, etc. The communication network may include a short-distance communication network such as a Magnetic Secure Transmission (MST), Radio Frequency IDentification (RFID), Near Field Communication (NFC), ZigBee, ZWave, Bluetooth, Bluetooth Low Energy (BLE), or InfraRed (IR) communication, etc. The communication network may include a Local Area Network (LAN), Metropolitan Area Network (MAN), or Wide Area Network (WAN), etc.

The first electronic device 100 and the second electronic device 150 connected with each other may transceive a message, file, voice data, image, or video and the like with each other. The second electronic device 150 may establish a voice call session or video call session with the first electronic device 100. The video call session may be established using, for example, Transmission Control Protocol (TCP), User Datagram Protocol (UDP), or Web Real-Time Communication (WebRTC), etc. A user of the first electronic device 100 and a user of the second electronic device 150 may have a voice call or video call with each other.

The video call session may be directly established between the first electronic device 100 and the second electronic device 150. According to another embodiment, the video call session may be established between the first electronic device 100 and the second electronic device 150 via at least one other device. For example, the video call session may include a session established between the first electronic device 100 and the server 200 and a session established between the server 200 and the second electronic device 150.

The server 200 may connect the plurality of electronic devices 100, 150 so that they can communicate with one another. The server 200 may receive a match request from each of the plurality of electronic devices 100, 150. In response to the match request, the server 200 may match the plurality of electronic devices 100, 150.

Hereinbelow, for convenience of explanation of the present disclosure, electronic device and terminal may be used to have the same meaning. Further, a communication method of the plurality of electronic devices 100, 150 and the server 200 will be explained with reference to FIGS. 2 to 11.

Figure 2:
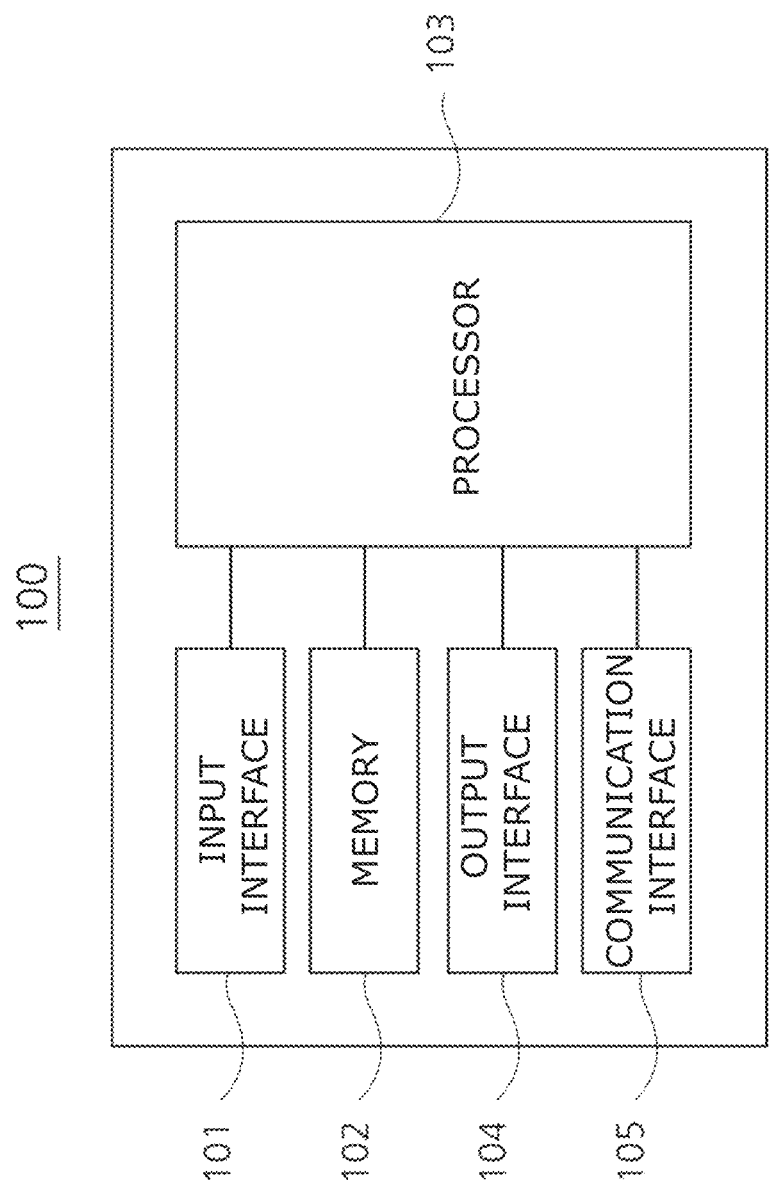
FIG. 2 is a block diagram illustrating a configuration of a terminal according to an embodiment of the present disclosure.

FIG. 2 is a block diagram illustrating a configuration of a terminal according to an embodiment of the present disclosure.

Referring to FIG. 2, a first terminal 100 may include an input interface 101, memory 102, processor 103, output interface 104, and communication interface 105. Referring to FIG. 1, a second terminal 150 may be embodied similarly or same as the first terminal 100.

The input interface 101 may receive a signal from outside. The input interface 101 may receive the signal from a user of the first terminal 100. Further, the input interface 101 may receive the signal from an external device. The input interface 101 may include, for example, a microphone, camera, keyboard, mouse, trackball, touch screen, button, switch, sensor, network interface, or other input devices, etc. The input interface 101 may receive voice from outside through the microphone included in the input interface 101. Further, the input interface 101 may receive a photographed video from the camera included in the input interface 101.

The touch screen included in the input interface 101 may receive a touch input from the user of the first terminal 100. The camera included in the input interface 101 may receive a gesture from the user of the first terminal 100.

The memory 102 may store data. The memory 102 may store voice or video data received from the input interface 101. Further, the memory 102 may store a result of operation performed by the processor 103. The memory 102 may store data to be transmitted outside through the communication interface 105, or store data received from outside through the communication interface 105.

The memory 102 may include at least one of a volatile memory or nonvolatile memory. The memory 102 may include at least one of, for example, flash memory, Read Only Memory (ROM), Random Access Memory (RAM), Electrically Erasable ROM (EEROM), Erasable Programmable ROM (EPROM), Electrically Erasable Programmable ROM (EEPROM), Hard Disk Drive (HDD), or register. The memory 102 may include, for example, a file system, database, or embedded database, etc.

The memory 102 may store a software or program. For example, the memory 102 may store a program and various kinds of data such as an application, and application programming interface (API), etc. The memory 102 may store commands executable by the processor 103.

The processor 103 or the configurative elements included in the processor 103 may each be embodied in the form of software or hardware. For example, the software may be embodied as program execution commands such as a machine code, firmware code, embedded code, and application, etc. The hardware may be an electric electronic circuit, processor, computer, pressure sensor, inertial sensor, microelectromechanical system (MEMS), passive element, or a combination thereof. The processor 103 may access the memory 102, and perform booting using an O/S stored in the memory 102. The processor 103 may perform various operations using various programs, contents, data and the like stored in the memory 102.

The processor 103 may control the operations of the first terminal 100. The processor 103 may be connected with each of the configurative elements included in the first terminal 100. The processor 103 may control the operations of each of the configurative elements included in the first terminal 100. The processor 103 may control the operations of the first terminal 100 in response to the signal received by the input interface 101.

The output interface 104 may display a screen. The processor 103 may control the output interface 104 to display the screen. The output interface 104 may display a user interface. The output interface 104 may display another screen in response to an input from the user.

The output interface 104 may display data. The output interface 104 may display a result of operation performed by the processor 103. The output interface 104 may display the data stored in the memory 102. The output interface 104 may display the data received by the communication interface 105. For example, the output interface 104 may display the video received from the server 200 or the second terminal 150. In another example, the output interface 104 may display the video received from the input interface 101.

The output interface 104 may include a flat panel display device such as a Liquid Crystal Display (LCD), Organic Light Emitting Diode (OLED), or Plasma Display Panel (PDP), etc. The output interface 104 may include a curved display or flexible display. The output interface 104 may include a touch screen.

The output interface 104 may output voice received from other terminals. The output interface 104 may output the voice received through the input interface 101. For example, the output interface 104 may include a speaker. The output interface 104 may output the voice received from the input interface 101 and the voice received from other terminals through the speaker.

The communication interface 105 may transmit data outside or receive data from outside. The communication interface 105 may transmit the data to the server 200 or to an external device. The communication interface 105 may receive data from the server 200 and an external device. The communication interface 105 may transmit the result of operation performed by the processor 103 outside. For example, the communication interface 105 may transmit a face recognition result that includes information about the number of faces, to the server 200. Further, the communication interface 105 may transmit the data stored in the memory 102, outside.

The data to be transmitted by the communication interface 105 and the data received by the communication interface 105 may be stored in the memory 102. For example, the communication interface 105 may transmit a message created in the processor 103, to the server 200.

The communication interface 105 may include a long-distance network interface such as, for example, a 3G module, LTE module, LTE-A module, Wi-Fi module, WiGig module, Ultra Wide Band (UWB) module, or LAN card, etc. Further, the communication interface 105 may include a short-distance network interface such as a Magnetic Secure Transmission (MST) module, Bluetooth module, Near Field Communication (NFC) module, Radio Frequency IDentification (RFID) module, ZigBee module, Z-Wave module, or InfraRed (IR) module, etc. Further, the communication interface 105 may include other network interfaces.

FIG. 3 is a view illustrating a terminal where a modulated video is provided according to an embodiment of the present disclosure.

Referring to FIGS. 2 and 3, the first terminal 100 may display a video stream of a first user 11, obtained through the input interface 101, and display a video stream of a second user 12 received from the second terminal 150 through the communication interface 105. According to an embodiment, the first terminal 100 may modulate the video of the second user 12 and display the modulated video. Therefore, the first user 11 may see the modulated video stream of the second user 12. Due to the modulation, the first user 11 cannot see any physical part or surrounding environment of the second user 12.

Likewise, the second terminal 150 may display the obtained video stream of the second user 12, and the video of the first user 11 received from the first terminal 100. According to an embodiment, the second terminal 150 may modulate the video of the first user 11 and display the modulated video. Therefore, the second user 12 may see the modulated video stream of the first user 11. Due to the modulation, the second user 12 cannot see any physical part or surrounding environment of the first user 11.

For example, the first terminal 100 and the second terminal 150 may perform the modulation utilizing a mosaic effect, background insertion, or blurring effect. Further, the first terminal 100 and the second terminal 150 may perform the modulation by adjusting a color, brightness, contrast or chroma. Further, the first terminal 100 and the second terminal 150 may perform the modulation utilizing a combination of the above-listed video processing.

According to an embodiment of the present disclosure, during a video call, the first terminal 100 may control a property of a voice signal output to the second terminal 150. By performing a voice modulation, mute processing, or volume adjustment and the like of the voice of the first user 11, the first terminal 100 may control the property of the voice signal of the first user 11 output to the second terminal 150. Further, the first terminal 100 may output an unmodulated voice signal of the first terminal 11 to the second terminal 150, and the second terminal 150 may control the property of the voice signal of the first user 11 received, and output the received voice signal.

Likewise, during a video call, the second terminal 150 may control the property of the voice signal output to the first terminal 100. By performing the voice modulation, mute processing, or volume adjustment and the like of the voice of the second user 12, the second terminal 150 may control the property of the voice signal of the second user 12 output to the first terminal 100. Further, the second terminal 150 may output an unmodulated voice signal of the second user 12 to the first terminal 100, and the first terminal 100 may control the property of the voice signal of the second user 12 received, and output the received voice signal.

Figure 4:
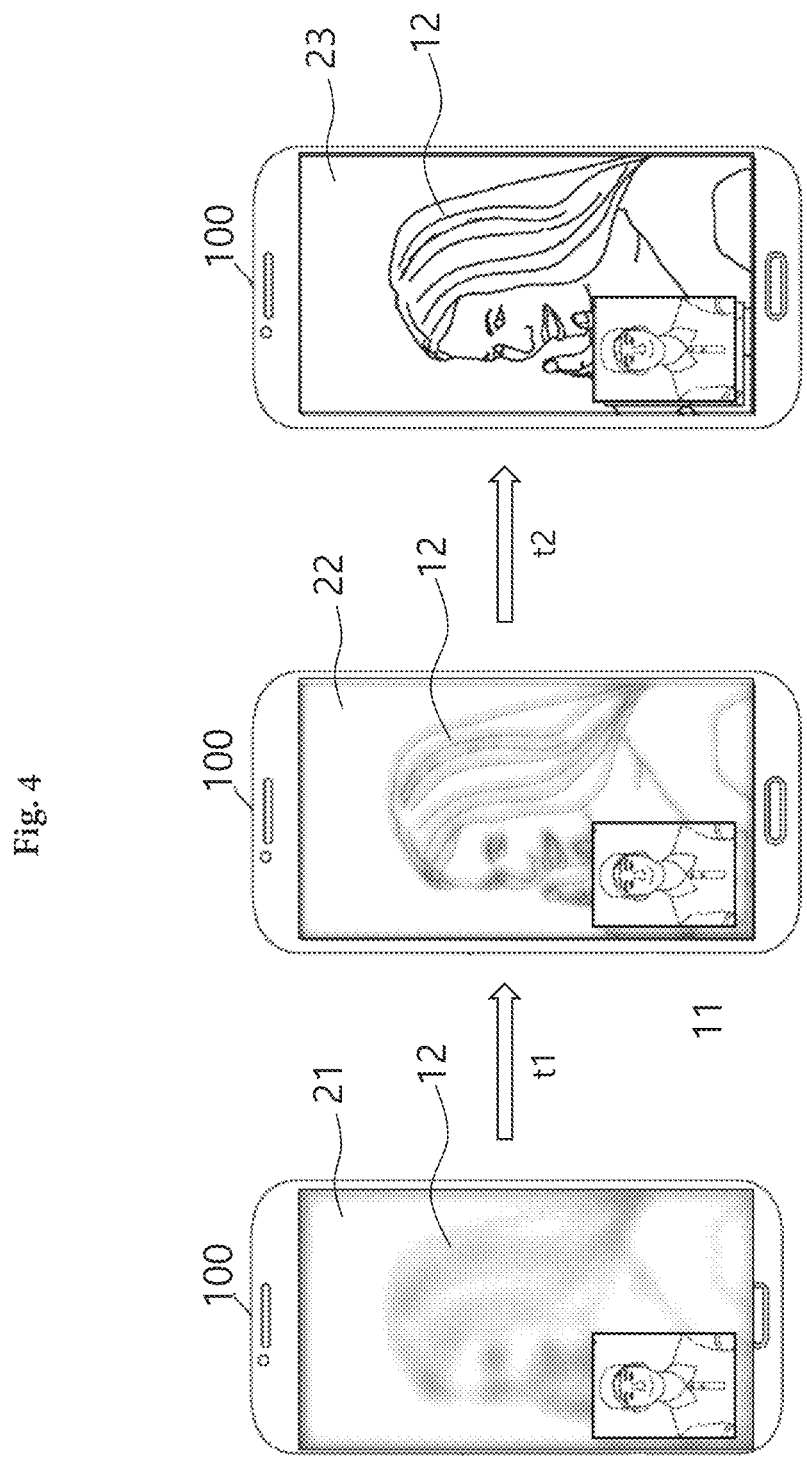
FIG. 4 is a view for explaining how a terminal controls the intensity of the modulation of a video after a predetermined period of time passed according to an embodiment of the present disclosure.

FIG. 4 is a view for explaining how a terminal controls the intensity of the modulation of a video after a predetermined period of time passed according to an embodiment of the present disclosure.

Referring to FIG. 4, the intensity of the modulation of the video of the second user 12 displayed on the first terminal 100 may be controlled under a certain condition. The intensity of the modulation of the video of the first user 11 displayed on the second terminal 150 may also be controlled in a similar or same manner as the video of the second user 12 displayed on the first terminal 100.

According to an embodiment of the present disclosure, specifically, when a video call session is initiated in the first terminal 100, the first terminal 100 may display a video 21 modulated to a first intensity. For example, the video 21 modulated to the first intensity may be a video of the second user 12 received from the second terminal 150, modulated to the fullest extent.

According to an embodiment of the present disclosure, as the period of time that the video call session between the first terminal 100 and the second terminal 150 is maintained, passes, the intensity of the modulation of the video of the second user 12 displayed on the first terminal 100 may become weaker. When the video call session is maintained for a first period of time (t1), the first terminal 100 may display a video 22 modulated to a second intensity. For example, the second intensity may be an intensity that is weaker than the first intensity. More specifically, the video 22 modulated to the second intensity may be clearer than the video 21 modulated to the first intensity. For example, the video 22 modulated to the second intensity may have a higher resolution than the video 21 modulated to the first intensity.

After the first period of time (t1), when the video call session is maintained further for a second period time (t2), the first terminal 100 may display a video 23 modulated to a third intensity. For example, the third intensity may be a weaker intensity than the second intensity. More specifically, the video 23 modulated to the third intensity may be clearer than the video 22 modulated to the second intensity. For example, the video 23 modulated to the third intensity may have a higher resolution than the video 22 modulated to the second intensity. Further, the video 23 modulated to the third intensity may be the original video received from the second terminal 150.

According to an embodiment of the present disclosure, the first terminal 100 and the second terminal 150 may adjust the intensity of the mosaic, background insertion, or blur processed on the video, to weaken the intensity of the modulation. For example, the first terminal 100 and the second terminal 150 may increase the resolution of the video by adjusting the intensity of the mosaic, background insertion, or blur processed on the video.

Further, the first terminal 100 and the second terminal 150 may weaken the intensity of the modulation by adjusting the color, brightness, contrast or chroma processed on the video. For example, the first terminal 100 and the second terminal 150 may increase the resolution of the video by adjusting the color, brightness, contrast, or chroma processed on the video.

Referring to FIG. 1 as well, when the video call between the first terminal 100 and the second terminal 150 is maintained for a predetermined period of time or more, the server 200 may control the intensity of the modulation of the video displayed on the first terminal 100 and the second terminal 150 and emit the video.

According to an embodiment of the present disclosure, as a certain period of time passes after establishing a video call session, the first terminal 100 and the second terminal 150 may control the intensity of the modulation of the video to the same intensity at the same time. The intensity of the modulation adjusted as the time passes may be predetermined by the user or manager of the server.

Figure 5:
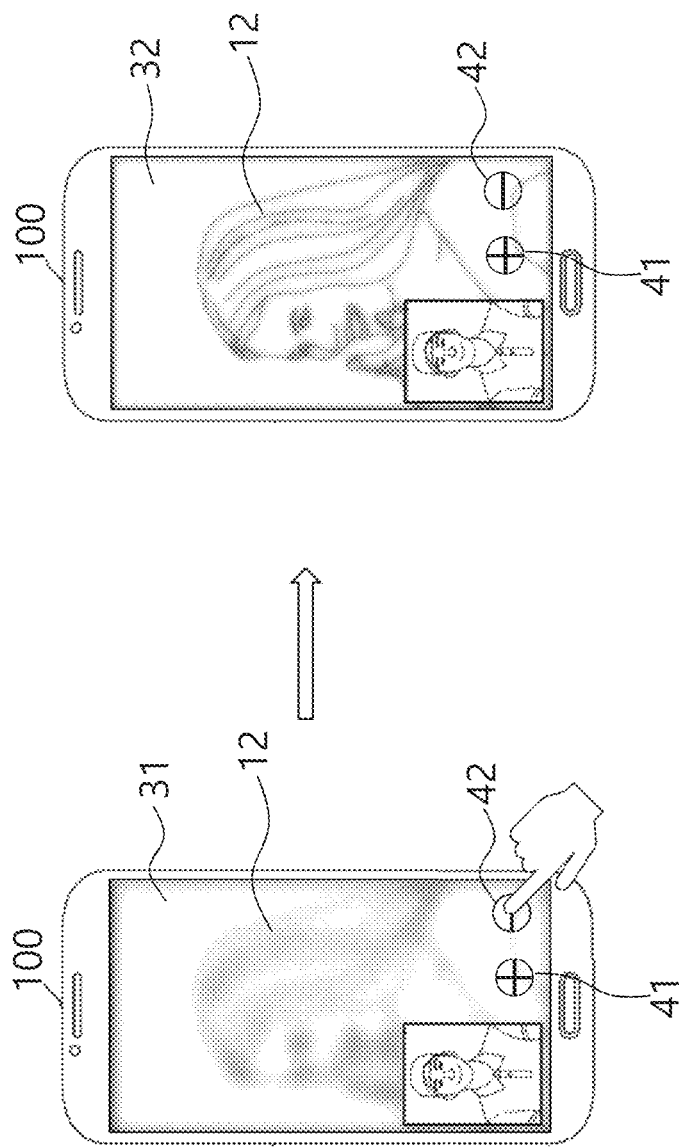
FIG. 5 is a view for explaining how the intensity of the modulation is controlled at a user's request according to an embodiment of the present disclosure.

FIG. 5 is a view for explaining how the intensity of the modulation is controlled at a user's request according to an embodiment of the present disclosure.

Referring to FIG. 5, the first terminal 100 may display a video 31 of the second user 12 modulated to the first intensity. The first terminal 100 may display a first intensity adjustment icon 41 and a second intensity adjustment icon 42 for adjusting the intensity of the modulation, together with the video 31 modulated to the first intensity.

According to an embodiment of the present disclosure, when an input of touching the first intensity adjustment icon 41 or the second intensity adjustment icon 42 displayed on the first terminal 100 by the user is received, the first terminal 100 may adjust the intensity of the video 31 modulated to the first intensity.

For example, when an input of touching the second intensity adjustment icon 42 by the user is received, the first terminal 100 may display a video 32 adjusted to the second intensity. The second intensity may be a weaker intensity than the first intensity. More specifically, the video 32 modulated to the second intensity may be clearer than the video 31 modulated to the first intensity.

On the contrary, when an input of touching the first intensity adjustment icon 41 by the user is received, the first terminal 100 may display a video modulated to a stronger intensity than the video 31 modulated to the first intensity.

When an input of touching the first intensity adjustment icon 41 or the second intensity adjustment icon 42 is received in the first terminal 100, the intensity of the modulation of the video of the first user displayed on the second terminal 150 may be adjusted together. For example, when an input of touching the first intensity adjustment icon 41 is received in the first terminal 100, the intensity of the modulation of the video of the first user displayed on the second terminal 150 may become stronger. On the contrary, when an input of touching the second intensity adjustment icon 42 is received in the first terminal 100, the intensity of the modulation of the video of the first user displayed on the second terminal 150 may become weaker.

According to an embodiment of the present disclosure, the intensity adjustment icons 41, 42 may be displayed as a button, icon, or arrow, etc. Further, the intensity adjustment icons 41, 42 may be arrayed in an arbitrary area of the video call screen.

Referring to FIG. 1 as well, when an input of touching the intensity adjustment icons 41, 42 is received, the first terminal 100 and the second terminal 150 may each transmit information thereof, to the server 200.

According to an embodiment of the present disclosure, the server 200 may control the intensity of the modulation of the video displayed on the first terminal 100 and the second terminal 150 based on the information received from the first terminal 100 and the second terminal 150 and emit the video.

Figure 6:
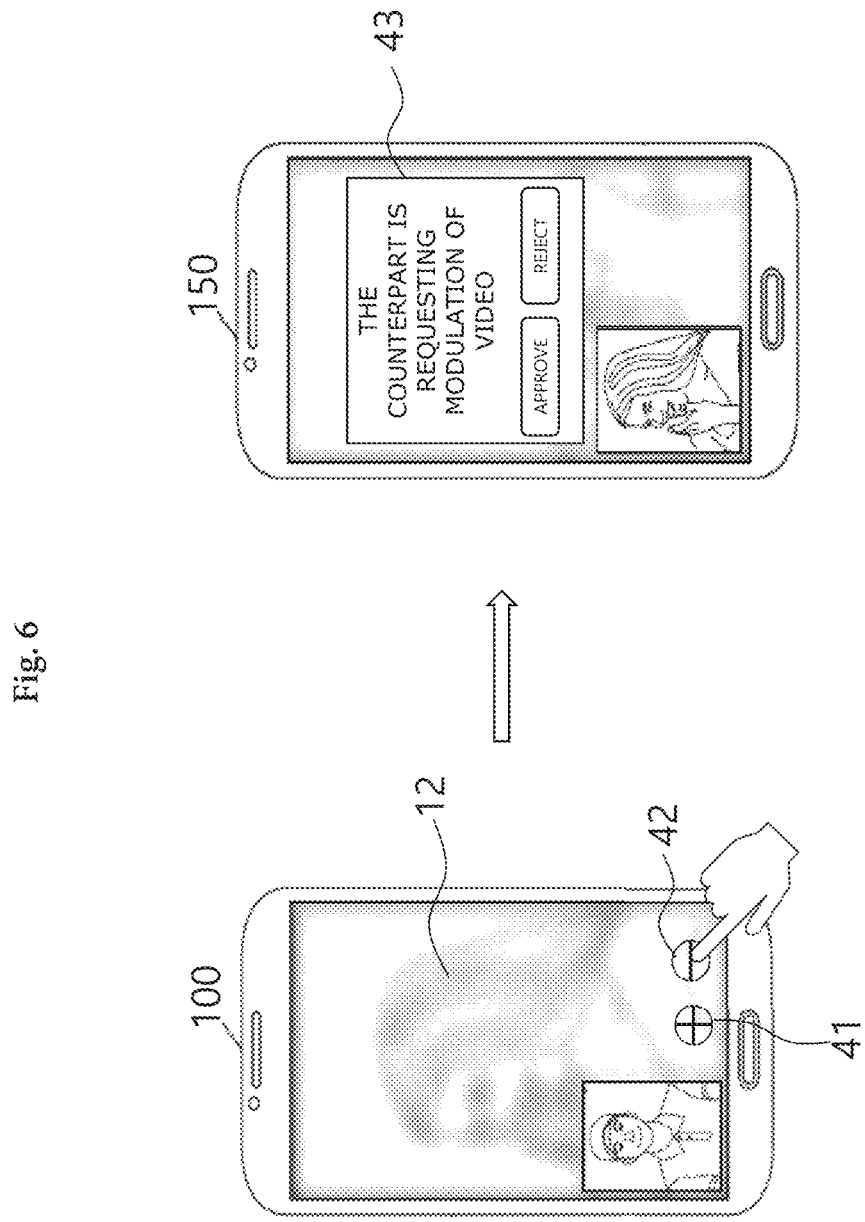
FIG. 6 is a view for explaining how the intensity of modulation is controlled at a user's request according to another embodiment of the present disclosure.

FIG. 6 is a view for explaining a method in which the intensity of the modulation is controlled at a user's request according to another embodiment of the present disclosure.

Referring to FIG. 6, whether to change the adjustment of the intensity of the modulation of a video may be determined at a user's decision. When at least one of the user of the first terminal 100 and the user of the second terminal 150 does not wish to adjust the intensity of the modulation of the video, the intensity of the modulation of the video may be maintained.

When an input of touching the first intensity adjustment icon 41 or the second intensity adjustment icon 42 displayed on the first terminal 100 by the user is received, the first terminal 100 may transmit a request to adjust the intensity of the modulation of the video, to the second terminal 150.

The second terminal 150 may receive the request from the first terminal 100. The second terminal 150 may display a request message 43. According to an embodiment, when an input of touching 'approve' by the second user 12, is received, the intensity of the modulation of the video of the second user 12 displayed on the first terminal 100 may be adjusted. Further, the intensity of the modulation of the video of the first user 11 displayed on the second terminal 150 may adjusted as well.

On the contrary, when an input of touching 'reject' by the second user 12 is received, the intensity of the modulation of the video of the second user 12 displayed on the first terminal 100 may not be adjusted. Further, the intensity of the modulation of the video of the first user 11 displayed on the second terminal 150 may not be adjusted either.

Figure 7:
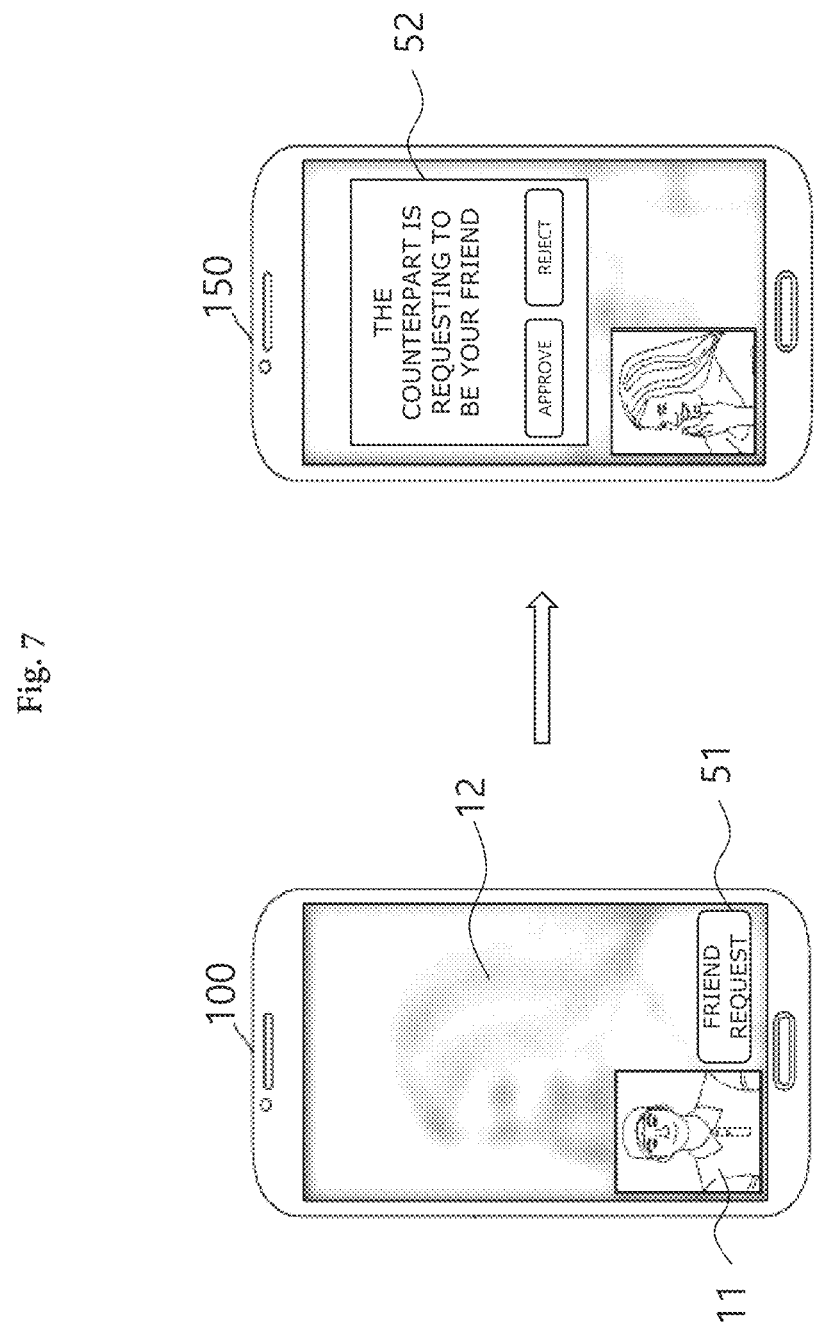
FIG. 7 is a view for explaining a method in which the intensity of the modulation is controlled at a user's request according to another embodiment of the present disclosure.

FIG. 7 is a view for explaining a method in which the intensity of the modulation is controlled at a user's request according to another embodiment of the present disclosure.

Referring to FIG. 7, whether to change the adjustment of the intensity of the modulation of a video may be determined at a user's decision. When at least one of the user of the first terminal 100 and the user of the second terminal 150 rejects a request to be friends, the intensity of the modulation of the video may be maintained.

When an input of touching a friend request icon 51 displayed on the first terminal 100 by the user is received, the first terminal 100 may transmit the friend request to the second terminal 150.

The second terminal 150 may receive the friend request from the first terminal 100. The second terminal 150 may display a friend request message 52. According to an embodiment of the present disclosure, when an input of touching 'approve' by the second user 12 is received, the intensity of the modulation of the video of the second user 12 displayed on the first terminal 100 may be adjusted. Further, the intensity of the modulation of the video of the first user 11 displayed on the second terminal 150 may be adjusted as well.

On the contrary, when an input of touching 'reject' by the second user 12 is received, the intensity of the modulation of the video of the second user 12 displayed on the first terminal 100 may not be adjusted. Further, the intensity of the modulation of the video of the first user 11 displayed on the second terminal 150 may not be adjusted either.

Referring to FIG. 1 as well, when an input of touching the friend request icon 51 is received, the first terminal 100 and the second terminal 150 may each transmit the information thereof to the server 200.

According to an embodiment of the present disclosure, the server 200 may control the intensity of the modulation of the video displayed on the first terminal 100 and the second terminal 150 based on the information received from the first terminal 100 and the second terminal 150 and transmit emit the video.

FIGS. 8A and 8B are views illustrating a method in which the intensity of the modulation of a video is controlled by an interaction detected between terminals according to an embodiment of the present disclosure.

According to an embodiment of the present disclosure, the intensity of the modulation of a video may be adjusted depending on whether the interaction occurred between the first terminal 100 and the second terminal 150. Referring to FIG. 8A, when a video call session is initiated between the first terminal 100 and the second terminal 150, the first terminal 100 may display a video 61 modulated to the first intensity, and the second terminal 150 may display a video 62 modulated to the first intensity. The first intensity may correspond to the strongest intensity.

In a partial area of a screen of each of the first terminal 100 and the second terminal 150, a good feeling expression icons 71, 72 for expressing a good feeling toward a counterpart may be displayed. For example, when an input of touching the first good feeling expression icon 71 is received in the first terminal 100 during the video call session between the first terminal 100 and the second terminal 150, the first terminal 100 may determine that the user of the first terminal 100 has a good feeling toward the user of the second terminal 150. Accordingly, the first terminal 100 may transmit good feeling information to the second terminal 150.

When the good feeling information is received from the first terminal 100, the second terminal 150 may display an emoticon 73 that corresponds to the good feeling information. Further, when an input of touching the second good feeling expression icon 72 is received in the second terminal 150 during the video call session between the first terminal 100 and the second terminal 150, the second terminal 150 may determine that the user of the second terminal 150 has a good feeling toward the user of the first terminal 100. Accordingly, the second terminal 150 may transmit the good feeling information to the first terminal 100.

Referring to FIG. 1 as well, when an input of touching the intensity adjustment icons 41, 42 is received, the first terminal 100 and the second terminal 150 may each transmit information thereof to the server 200.

According to an embodiment, the server 200 may control the intensity of the modulation of the video displayed on the first terminal 100 and the second terminal 150 based on the information received from the first terminal 100 and the second terminal 150, and emit the video.

FIG. 8B is a view illustrating a screen after the transmission of good feeling information between the first terminal 100 and the second terminal 150. Referring to FIGS. 8A and 8B, when an input of touching a good feeling expression icons 71, 72 is received in at least one of the first terminal 100 and the second terminal 150, the intensity of the modulation of a video displayed on each of the first terminal 100 and the second terminal 150 may be changed.

For example, the first terminal 100 may display a video 63 modulated to the second intensity, and the second terminal 150 may display a video 64 modulated to the second intensity. The second intensity may be a weaker intensity than the first intensity. Specifically, the videos 63, 64 modulated to the second intensity may each be clearer than the videos 61, 62 modulated to the first intensity. Further, when the good feeling expression is maintained between the first terminal 100 and the second terminal 150, the intensity of the modulation of the video displayed on each of the first terminal 100 and the second terminal 150 may gradually become weaker than the second intensity. Further, the videos 63, 64 modulated to the second intensity may each be the original video.

As abovementioned, when there is a good feeling toward at least one of the users of the first terminal 100 and the second terminal 150, the intensity of the modulation of the video displayed on each of the first terminal 100 and the second terminal 150 may become weaker.

Figure 9A:
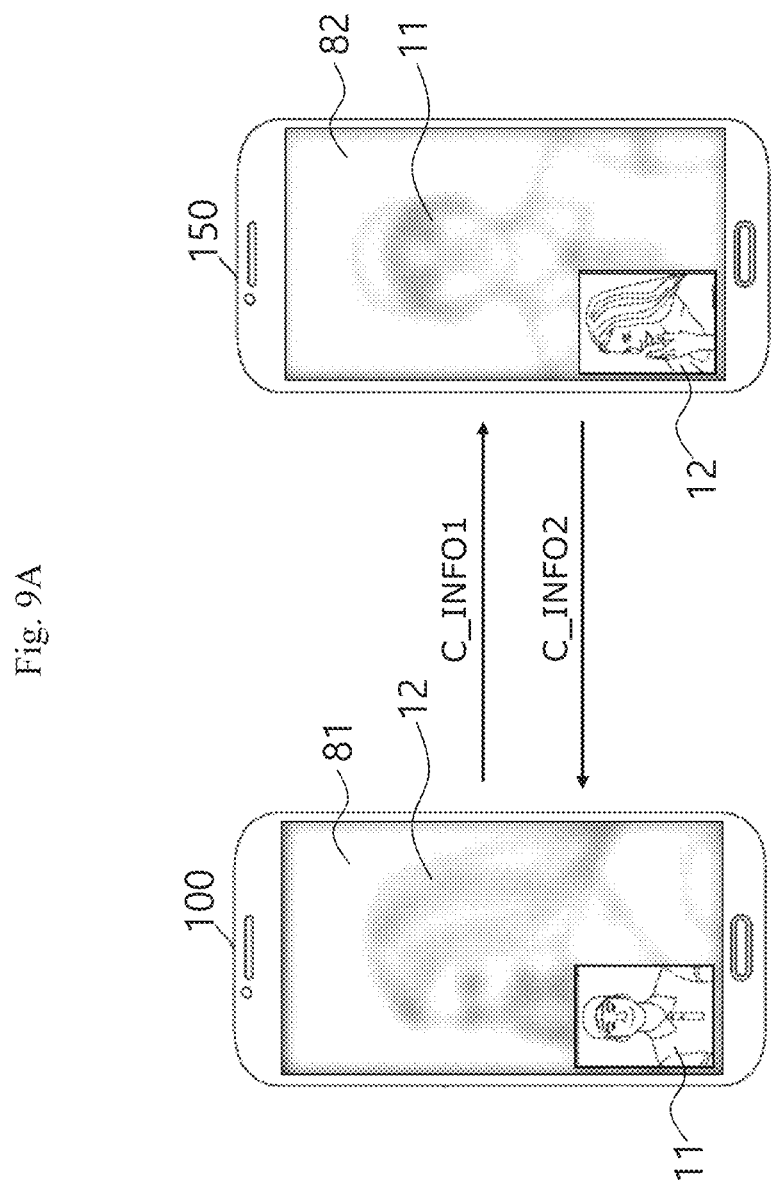

FIGS. 9A and 9B are views illustrating a method in which the intensity of the modulation of a video is controlled by an interaction detected between the terminals according to another embodiment of the present disclosure.

Referring to FIG. 9A, when a video call session is initiated between the first terminal 100 and the second terminal 150, the first terminal 100 may display a video 81 modulated to the first intensity, and the second terminal 150 may display a video 82 modulated to the first intensity. The first intensity may correspond to the strongest intensity.

The first terminal 100 may detect a gesture of the first user 11 from a photographed video of the first user 11. The second terminal 150 may detect a gesture of the second user 12 from a photographed video of the second user 12. When at least one of the gesture of the first user 11 and the gesture of the second user 12 corresponds to information classified as a positive response, the intensity of the modulation of the video displayed on each of the first terminal 100 and the second terminal 150 may become weaker. For example, the positive response may mean a response of preference that the first user 11 or the second user 12 expresses to a counterpart verbally or non-verbally.

According to an embodiment of the present disclosure, the gesture means non-verbal communication that a user delivers using the face, hand, or body and the like, and the gesture may be a facial expression, hand gesture, or body gesture, etc. By making the gesture, the user may communicate one's intentions to the counterpart, or induce a certain response from the counterpart.

For example, the facial expression refers to the user indicating one's thoughts by moving an eye, eyebrow, nose, mouth, forehead, or cheek and the like through one's face. For example, the facial expression may be blinking the eye, opening the eye wide open or closing the eye, raising the corner of the mouth, opening the mouth, biting the lips, or frowning the forehead, etc. The hand gesture may be making an OK sign, putting a thumb up or down, making the letter 'V', waving the hand back and forth, or waving the hand right and left, etc. The body gesture may be twisting the body, shrugging the shoulder, or folding the arms, etc.

According to an embodiment of the present disclosure, the first terminal 100 may detect a gesture of the first user 11, and whether the gesture is positive information or negative information may be obtained by an artificial intelligence learning model. The second terminal 150 may detect the gesture of the second user 12, and whether the gesture is positive information or negative information may be obtained by the artificial intelligence learning model. The artificial intelligence learning model may be a result of learning a correlation between gestures and emotion information based on information of communication between the user and other users.

According to an embodiment of the present disclosure, the first terminal 100 and the second terminal 150 may utilize a learning model according to the Deep Neural Network technology in order to determine whether the gesture is positive.

According to an embodiment of the present disclosure, when determining that the first user 11 and the second user 12 are smiling using facial characteristics such as the eye, nose, or mouth and the like of the first user 11 and the second user 12, the first terminal 100 and the second terminal 150 may each determine a "smile" or "positive". Accordingly, the first terminal 100 and the second terminal 150 may each determine that the communication state of the first user 11 and the second user 12 is positive, and the intensity of the modulation of the video displayed on the first terminal 100 and the intensity of the modulation of the video displayed on the second terminal 150 may become weaker.

According to an embodiment of the present disclosure, the first terminal 100 may detect at least one of a text, voice, or emoticon input from the first user 11. The second terminal 150 may detect at least one of a text, voice, or emoticon input from the second user 12. When at least one of a text, voice, or emoticon input from the first user 11 and a text, voice, or emoticon input from the second user 12 corresponds to the information classified as positive response, the intensity of the modulation of the video displayed on each of the first terminal 100 and the second terminal 150 may become weaker.

According to an embodiment of the present disclosure, the first terminal 100 and the second terminal 150 may detect communication information transceived between each other. According to the present disclosure, the communication information may include at least one of gesture information, emoticon information, text information, and voice information.

At least one of first communication information C_INFO1 transmitted from the first terminal 100 to the second terminal 150 and second communication information C_INFO2 transmitted from the second terminal 150 to the first terminal 100 may be determined as "positive".

Referring to FIG. 9B as well, when the first terminal 100 determines that the communication state of the first user 11 and the second user 12 is positive, the first terminal 100 may display a video 83 modulated to the second intensity. Further, when the second terminal 150 determines that the communication state of the first user 11 and the second user 12 is positive, the second terminal 150 may display a video 84 modulated to the second intensity.

Specifically, the videos 83, 84 modulated to the second intensity may each be clearer than the videos 81, 82 modulated to the first intensity. When positive communication is maintained between the first terminal 100 and the second terminal 150, the intensity of the modulation of the video displayed on each of the first terminal 100 and the second terminal 150 may gradually become weaker than the second intensity. Further, the videos 83, 84 modulated to the second intensity may each be the original video.

According to another embodiment, when it is determined that the communication state between the first terminal 100 and the second terminal 150 is negative, the intensity of the modulation of the video displayed on each of the first terminal 100 and the second terminal 150 may be maintained or become stronger.

Referring to FIG. 1 as well, the first terminal 100 and the second terminal 150 may each transmit at least one of gesture information, emoticon information and text information detected from the video of the first user 11 and the video of the second user 12, to the server 200.

According to an embodiment of the present disclosure, the server 200 may transmit a signal for controlling the intensity of the modulation of the video displayed on the first terminal 100 and the second terminal 150 based on at least one of the voice information, gesture information, emoticon information and text information received from the first terminal 100 and the second terminal 150.

According to another embodiment, when the server 200 determines that the communication state of the first user 11 and the second user 12 is positive, the server 200 may transmit a control signal for controlling the intensity of the modulation of the video displayed on the first terminal 100 and the second terminal 150. On the contrary, when the server 200 determines that the communication state of the first user 11 and the second user 12 is negative, the server 200 may transmit a control signal for controlling the intensity of the modulation of the video displayed on the first terminal 100 and the second terminal 150.

Referring to FIGS. 4 to 9, the users 11, 12 of the terminals 100, 150 may not directly expose their video and surrounding environment to the counterpart. The users 11, 12 of the terminals 100, 150 may check each other's video after having conversation for a certain period of time or after having positive communication. Therefore, the users may protect their portrait right and privacy during the video call.

Figure 10:
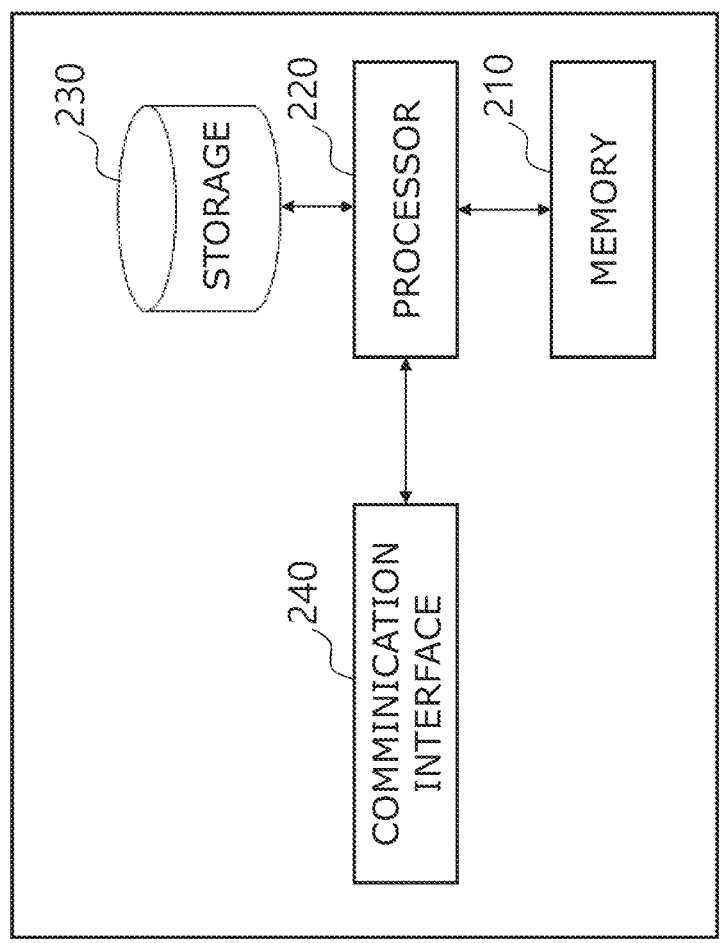
FIG. 10 is a block diagram illustrating a configuration of a server providing a video call service according to an embodiment of the present disclosure.

FIG. 10 is a block diagram illustrating a configuration of the server providing a video call service according to an embodiment of the present disclosure.

Referring to FIG. 10, the server 200 providing a video call service may include a memory 210, processor 220, storage 230, and communication interface 240. A person skilled in the art related to the present embodiment may well know that the server 200 may include other widely used configurative elements besides the configurative elements illustrated in FIG. 10. The configurative elements of the block diagram of FIG. 10 may each be separated, added, or omitted depending on the embodiment method of the server 200.

The memory 210 may store commands executable by the processor 220. The memory 210 may store a software or program.

The processor 220 may execute the commands stored in the memory 220. The processor 220 may perform the overall control of the server 200 providing a video call service. The processor 220 may obtain information and requests received through the communication interface 240, and store the information received, in the storage 230. Further, the processor 220 may process the information received. For example, the processor 220 may create information used in the video call service from the information received from the terminal 100, or process the managing information received, and store the created information or processed information in the storage 230. Further, in response to the request obtained from the terminal, the processor 220 may use the information stored in the storage 230, to transmit information for providing a video call service to the terminal through the communication interface 240.

The storage 230 may store various software and information necessary for the server 200 to provide a video call service. For example, the storage 230 may store the program and application executed in the server 200 providing a video call service, and various data used in the video call service.

The storage 230 may database personal information of users who use the video call service per user, and store and manage the databased personal information. The storage 230 may store the personal information of the users and various information used in the video call service and the like per account for accessing the server 200 providing the video call service.

The communication interface 240 may perform communication with an external device including the first terminal 100 and the second terminal 150. For example, the server 200 may receive a request to initiate a video call service, or a request for setting information for being equipped with a video call service environment and the like, from the terminal. Further, in response to the request by the terminal, the server 200 may provide all that is related to the video call service.

Figure 11:
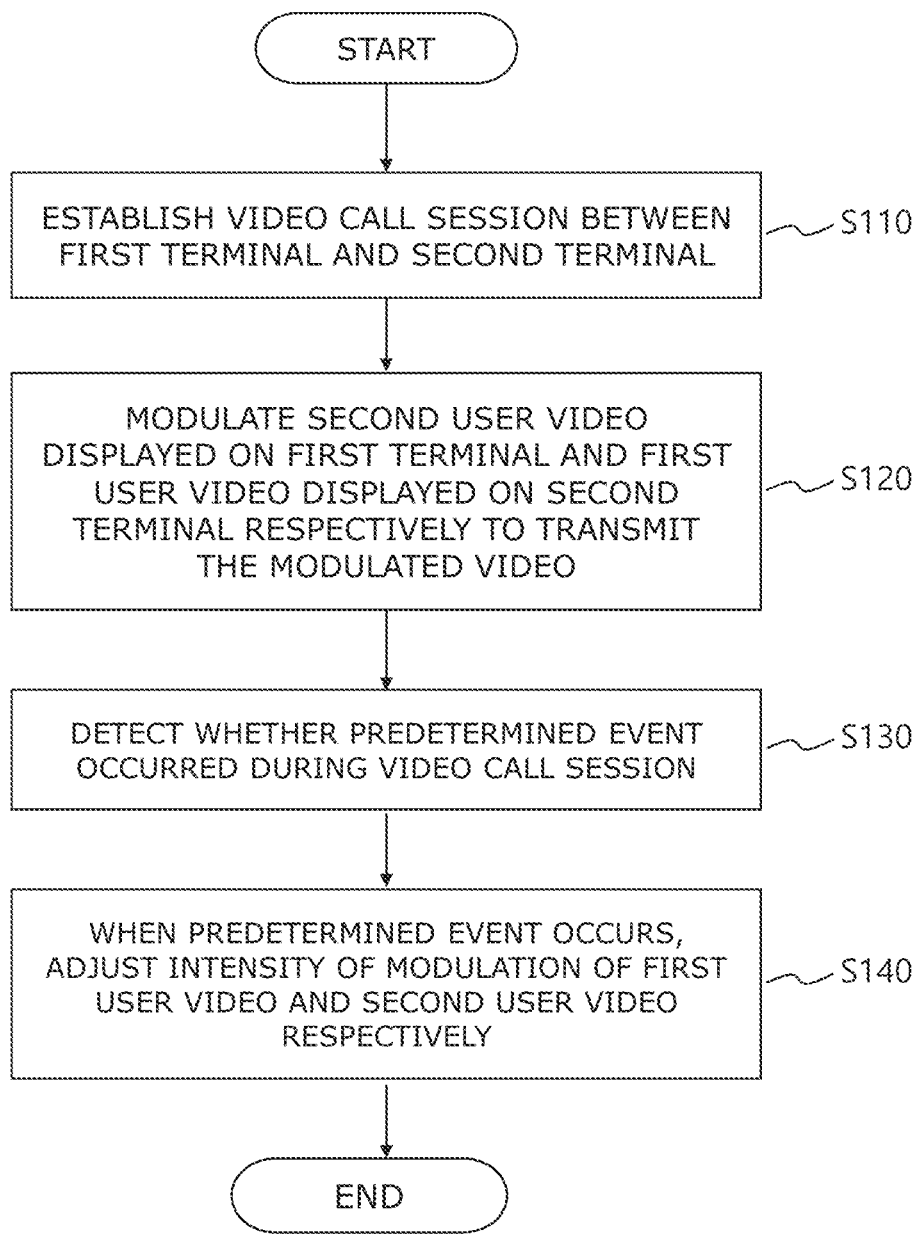
FIG. 11 is a flowchart for illustrating a method for providing a video call service according to an embodiment of the present disclosure.

FIG. 11 is a flowchart for illustrating a method for providing a video call service according to an embodiment of the present disclosure.

At S110, the server 200 may establish a video call session between the first terminal 100 and the second terminal 150. According to the present disclosure, the server 200 may receive a photographed first video stream of the first user 11 from the first terminal 100 and transmit the first video stream to the second terminal 150. Further, the server 200 may receive a photographed second video stream of the second user 12 from the second terminal 150 and transmit the second video stream to the first terminal 100.

At S120, the server 200 may modulate the second user video and emit the modulated video to the first terminal 100. Further, the server 200 may modulate the first user video and emit the modulated video to the second terminal 150. The first terminal 100 may display the modulated second user video received from the server 200, and the second terminal 150 may display the modulated first user video received from the server 200.

At S130, the server 200 may detect a predetermined event while the video call session between the first terminal 100 and the second terminal 150 is being maintained. According to an embodiment of the present disclosure, the predetermined event may include at least one of the period of time the video call of the first terminal 100 and the second terminal 150 is maintained, user input requesting adjustment of the intensity of the modulation, request to add friend, user's gesture detected from the video and text information used during the video call, voice signal, or emoticon information.

At S140, the server 200 may control the intensity of the modulation of the video displayed on the first terminal 100 and the second terminal 150 based on the detected predetermined event. More specifically, the server 200 may adjust the intensity of the modulation of the second user video displayed on the first terminal 100 and the intensity of the modulation of the first user video displayed on the second terminal 150.

Embodiments explained hereinabove may be embodied in the form of a recording medium including commands executable by a computer such as a program module executable by a computer. The computer readable medium may be an arbitrary available medium that may be accessed by a computer, and the computer readable medium may include all the volatile and non-volatile medium, and separable and non-separable medium.

Further, the computer readable medium may include a computer recording medium or communication medium. The computer recording medium may include all the volatile and non-volatile, separable and non-separable medium embodied in an arbitrary method or technology for storing information such as a computer readable command, data structure, program module, or other data. The communication medium typically includes a computer readable command, data structure, program module, or other data of a modulated data signal such as a carrier wave, or other output mechanisms, and the communication medium may also include an arbitrary information transmission medium.

Embodiments of the present disclosure were explained hereinabove with reference to the drawings attached, but a person skilled in the art that the present disclosure belongs to will understand that the present disclosure can be implemented in other specific forms without altering its technical idea or essential characteristics. Therefore, the embodiments described hereinabove are exemplary in all aspects and should not be understood as being limitative.

What is claimed is:

1. A method for providing a video call service at a first terminal, the method comprising:
   establishing, using a processor, a video call session with a second terminal;
   transmitting, using the processor, a first video that is a photographed video of a first user, from the first terminal to the second terminal;
   modulating, using the processor, a second video that is a photographed video of a second user and that is received from the second terminal, to a first intensity, and displaying the modulated second video;
   detecting, using the processor, a predetermined event while the video call session is being maintained, where the predetermined event comprises a predetermined gesture of the first user detected from the first video; and
   controlling, using the processor, an intensity of the modulation based on the predetermined event, wherein controlling the intensity comprises:
      determining a different second intensity based on the predetermined gesture; and
      displaying the second video modulated to the second intensity.

2. The application according to claim 1, wherein the method further comprises detecting a second predetermined event, where the second predetermined event is a period of time the video call session is being maintained between the first terminal and the second terminal.

3. The method according to claim 2, wherein controlling an intensity of the modulation is further based on the second predetermined event, where the controlling an intensity of the modulation further comprises:
   when the video call session is maintained for a first period of time, adjusting the intensity of the modulation to a second intensity and displaying the second video modulated to the second intensity; and
   when the video call session is maintained for a second period of time after the first period of time, adjusting the intensity of the modulation to a third intensity and displaying the second video modulated to the third intensity,
   wherein the second video modulated to the second intensity is clearer than the second video modulated to the first intensity, and the second video modulated to the third intensity is clearer than the second video modulated to the second intensity.

4. The method according to claim 1, wherein the method further comprises detecting a second predetermined event, where the second predetermined event is an input of the first user of selecting a modulation intensity adjustment icon displayed on a screen of the first terminal.

5. The method according to claim 4, wherein controlling an intensity of the modulation is further based on the second predetermined event, where the controlling an intensity of the modulation further comprises:
   when the input of the first user of selecting a first modulation intensity adjustment icon is received, adjusting the intensity of the modulation to a second intensity that is lower than the first intensity and displaying the second video modulated to the second intensity.

6. The method according to claim 5, wherein the controlling an intensity of the modulation further comprises:
   when an input of the first user of selecting a second modulation intensity adjustment icon is received, adjusting the intensity of the modulation to a third intensity that is higher than the first intensity and displaying the second video modulated to the third intensity.

7. The method according to claim 4, wherein controlling an intensity of the modulation is further based on the second predetermined event, where the controlling an intensity of the modulation further comprises:
   transmitting a request signal for adjusting the intensity of the modulation to the second terminal;
   receiving an approval signal for the adjusting of the intensity of the modulation in response to the request signal from the second terminal; and
   based on the approval signal, adjusting the intensity of the modulation to a second intensity that is lower than the first intensity and displaying the second video modulated to the second intensity.

8. The method according to claim 1, wherein the method further comprises detecting a second predetermined event, where the second predetermined event is an input of the first user of selecting a friend request icon displayed on a screen of the first terminal.

9. The method according to claim 8, wherein controlling an intensity of the modulation is further based on the second predetermined event, where the controlling an intensity of the modulation further comprises:
   in response to the selecting the friend request icon, transmitting a friend request signal to the second terminal;
   subsequent to the friend request signal, receiving from the second terminal an approval signal for the friend request; and
   based on the approval signal, adjusting the intensity of the modulation to a second intensity that is lower than the first intensity and displaying the second video modulated to the second intensity.

10. The method according to claim 1, wherein the modulating the second video of the second user received from the second terminal to the first intensity and displaying the modulated video comprises:
    applying a blur effect or mosaic effect to the second video, or adjusting a color, brightness, contrast or chroma of the second video.

11. The method according to claim 1, wherein the predetermined event comprises:
    at least one of text information, voice information, and emoticon information used during the video call session.

12. A server comprising:
    an interface for performing communication with at least one terminal;
    a processor; and
    a memory for storing commands executable by the processor,
    wherein the processor is configured to:
       establish a video call session between a first terminal and a second terminal of the at least one terminal,
       modulate a video of a first user received from the first terminal and emits the modulated video of the first user to the second terminal, modulate a video of a second user received from the second terminal and transmit the modulated video of the second user to the first terminal, detect a predetermined event from at least one of the first terminal and the second terminal, where the predetermined event comprises a predetermined gesture of the first user detected from the first video, and adjust an intensity of the modulation of the video of the first user and the video of the second user based on the predetermined event, wherein adjusting the intensity comprises:
determining a different second intensity based on the predetermined gesture; and
displaying the second video modulated to the second intensity.

13. A non-transitory computer readable recording medium where commands executable by a processor are stored, the recording medium comprising commands for:

establishing a video call session between a first terminal and a second terminal;

modulating a video of a second user received from the second terminal and displaying the modulated video of the second user;

detecting a predetermined event while the video call session is being maintained, where the predetermined event comprises a predetermined gesture of the first user detected from the first video; and controlling an intensity of the modulation based on the predetermined event, wherein controlling the intensity comprises:
determining a different second intensity based on the predetermined gesture; and
displaying the second video modulated to the second intensity.

14. A method for providing a video call service at a first terminal, the method comprising:

establishing, using a processor, a video call session with a second terminal;

transmitting, using the processor, a first video that is a photographed video of a first user, from the first terminal to the second terminal;

modulating, using the processor, a second video that is a photographed video of a second user and that is received from the second terminal, to a first intensity, and displaying the modulated second video;

detecting, using the processor, a predetermined event while the video call session is being maintained, where the predetermined event comprises an input of the first user of selecting a modulation intensity adjustment icon displayed on a screen of the first terminal; and controlling, using the processor, an intensity of the modulation based on the predetermined event, wherein controlling the intensity comprises:
transmitting a request signal for adjusting the intensity of the modulation to the second terminal;
receiving an approval signal for the adjusting of the intensity of the modulation in response to the request signal from the second terminal;
based on the approval signal, adjusting the intensity of the modulation to a second intensity that is different from the first intensity; and
displaying the second video modulated to the second intensity.

15. A method for providing a video call service at a first terminal, the method comprising:

establishing, using a processor, a video call session with a second terminal;

transmitting, using the processor, a first video that is a photographed video of a first user, from the first terminal to the second terminal;

modulating, using the processor, a second video that is a photographed video of a second user and that is received from the second terminal, to a first intensity, and displaying the modulated second video;

detecting, using the processor, a predetermined event while the video call session is being maintained, where the predetermined event comprises an input of the first user of selecting a friend request icon displayed on a screen of the first terminal; and controlling, using the processor, an intensity of the modulation based on the predetermined event, wherein controlling the intensity comprises:
in response to the selecting of the friend request icon, transmitting a friend request signal to the second terminal;
subsequent to the friend request signal, receiving from the second terminal an approval signal for the friend request;
based on the approval signal, adjusting the intensity of the modulation to a second intensity that is different than the first intensity; and
displaying the second video modulated to the second intensity.

* * * * *